Dec. 30, 1952   A. A. LYNESS, JR., ET AL   2,623,983
HIGH-FREQUENCY INDUCTION HEATING APPARATUS
Filed March 11, 1950   2 SHEETS—SHEET 2
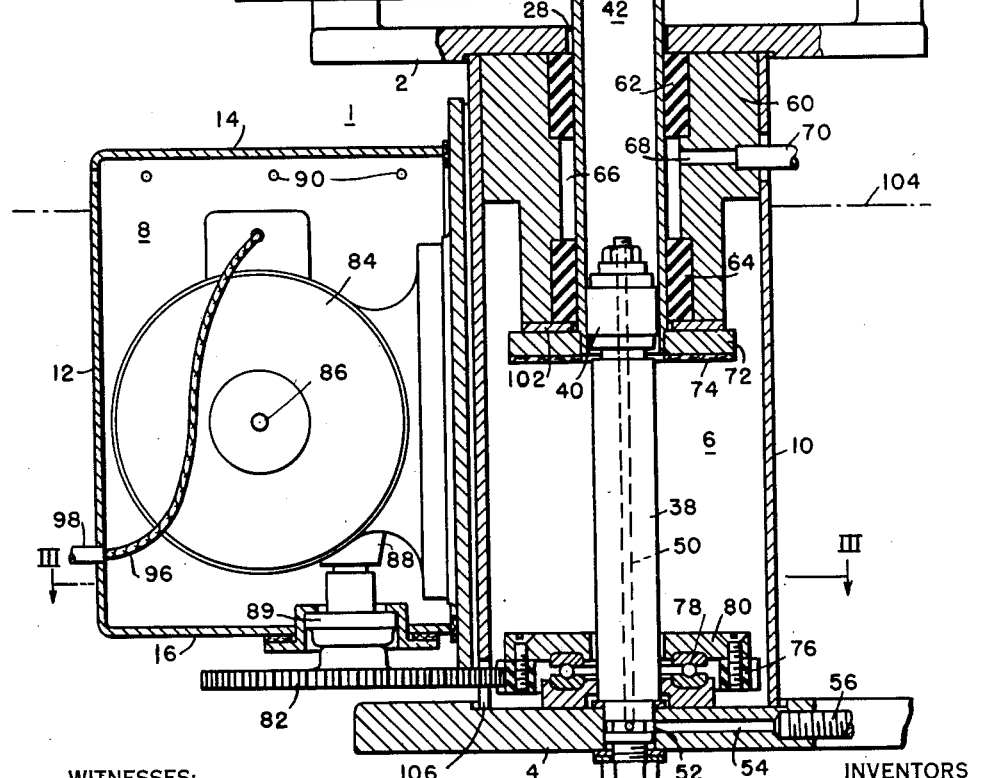
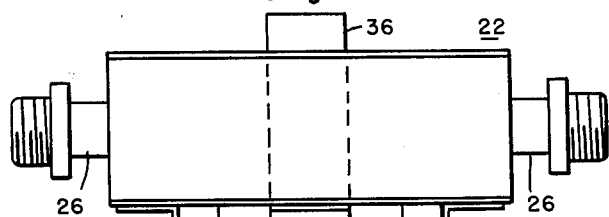
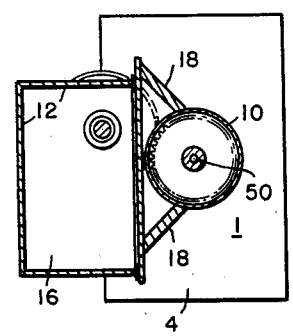
WITNESSES:
E.A. McCloskey
Nw. L. Groome
INVENTORS
Arthur A. Lyness, Jr.
and Theodore P. Kinn.
BY
B. L. Zangwill
ATTORNEY Patented Dec. 30, 1952

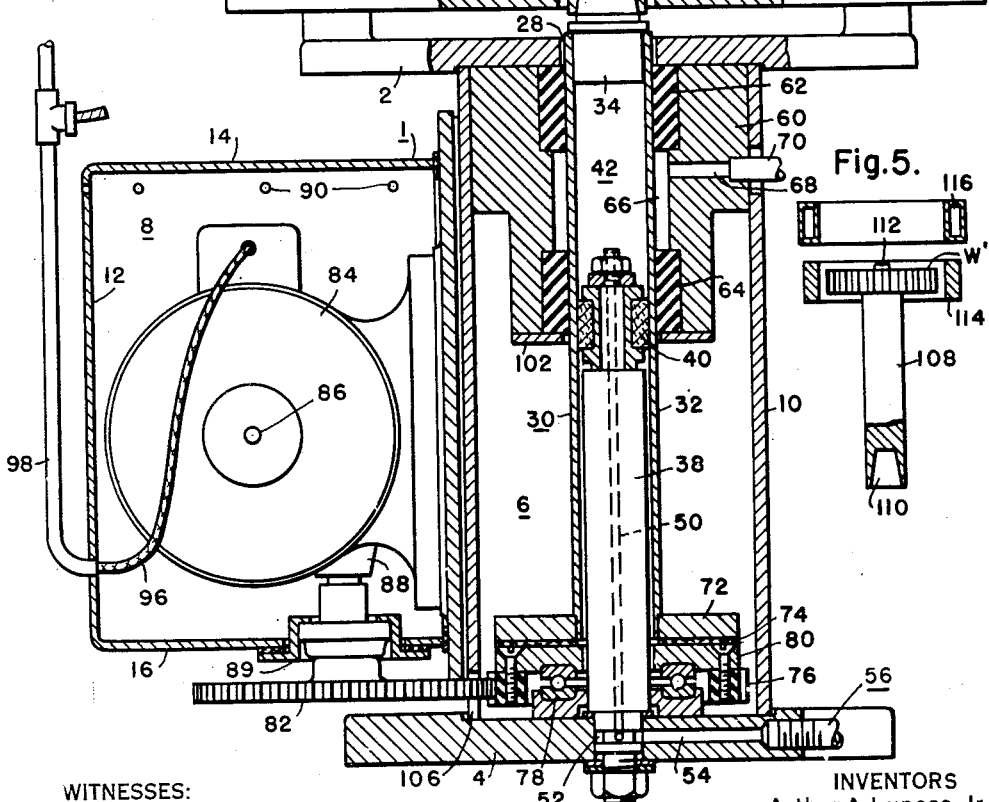

2,623,983

UNITED STATES PATENT OFFICE 2,623,983

HIGH-FREQUENCY INDUCTION HEATING APPARATUS

Arthur A. Lyness, Jr., Towson, and Theodore P. Kinn, Baltimore, Md., assignors to Westinghouse Electric Corporation, East Pittsburgh, Pa., a corporation of Pennsylvania Application March 11, 1950, Serial No. 149,146

8 Claims. (Cl. 219—47)

Broadly, this invention relates to high frequency apparatus for inductively heating workpieces. More specifically, the invention is directed to apparatus for supporting a workpiece so that it can be readily moved into heating relation with an induction heating coil, rotated while in such relation, and then moved out of such relation so that the heat-treated workpiece can be easily replaced with another to be heat treated.

It is an object of our invention to provide an apparatus of the type described which can be placed inside of the sink of a self-contained complete induction heating unit of a type well known in the art.

A further object of our invention is to provide an apparatus of a type described which comprises a reciprocal member, or spindle, that is raised to an upper position where it can be loaded with a workpiece to be heat treated and then dropped to a lower position in which it brings the workpiece into an induction heating coil for heat treatment. Preferably, operating means is provided for the spindle which forcibly raises and lowers the spindle between limiting positions without rotation, but which rotates the spindle in its lower position.

In accordance with a preferred form of our invention, the spindle is a hollow upright tube having a closing wall at its upper end, the wall preferably also providing a seat adapted to receive a workpiece or an adapter that, in turn, receives the workpiece. The hollow spindle is provided with an inner bearing means. The inner bearing is at the upper end of a stationary piston rod that fits into the lower end of the spindle. A pipe line passes along this piston rod and opens into the hollow of the spindle. When gas, such as air, under pressure is delivered to this pipe line the spindle is raised, and when the gas is exhausted or open to atmosphere, the spindle drops. Preferably, the lower end of the spindle is provided with a driven clutch member that engages a rotating driving clutch member when the spindle is in its lower position so that the spindle automatically starts to rotate when it reaches such position.

Objects, features and innovations of our invention, in addition to the foregoing, will be discernible from the following description of a preferred form thereof to which the broader aspects of the invention are not limited. The description is to be taken in conjunction with the accompanying drawings which are on different scales and wherein Figure 1 is a vertical sectional view of an embodiment of our invention, showing the spindle in its lower rotating position;

Fig. 2 is a vertical sectional view, with parts in elevation, illustrating the apparatus of Fig. 1 with the spindle raised;

Fig. 3 is a sectional view substantially on the line III—III of Fig. 2;

Fig. 4 is an enlarged sectional view of a detail-part in the embodiment shown in Figs. 1 and 2; and Fig. 5 is a modified form of adapter for use with the spindle of Figs. 1 and 2, and also shows a different arrangement of induction heating coil and quench ring.

Referring to the drawings, apparatus in accordance with our invention comprises a main housing 1 having a top wall means 2, a bottom wall 4 and upstanding walls forming two compartments 6 and 8. The compartment 6 is formed by a tubular wall 10 that extends between and is secured to the top and bottom walls 4 and 6. The compartment 8 is formed so as to be substantially water-tight and comprises a plurality of upstanding outer walls 12, a top wall 14 and a bottom wall 16. As shown in Fig. 3, one of the upstanding walls 12 is rigidly connected to the tubular wall 10 by means of brace walls 18.

The top wall means 2 of the main housing carries a plurality of insulating posts 20 that support an induction heating coil 22. The induction heating coil 22 is formed of a split hollow conductor having a perforated inner wall 24 through which quench liquid may be discharged onto any workpiece inside of the induction heating coil; the quench liquid being supplied through any suitable means such as a pipe or pipes 26. High frequency current is also supplied to the split insulated ends of the coil in a known manner.

The top wall means 2 is provided with an opening or openings 28 through which a work-carrying spindle may be reciprocated. The spindle is indicated in its entirety by the reference numeral 30, and comprises a circular tube or tubular member 32 of uniform thickness and provided with a closing wall at its upper end in the form of a head 34. The outside of the head 34 is finished to provide a tapered seat for receiving a work-carrying adapter 36.

A piston rod 38 is secured to the bottom wall 4 of the main housing 1. This piston rod 38 is coaxial with the spindle 30 and the induction heating coil 22. The piston rod extends a little more than half way up the outer tubular wall 10 of the compartment 6. The upper end of the piston rod 38 has a bearing means 40 that bears against the inside surface of the tubular member 32 of the spindle 30; this bearing means preferably being in the nature of a packing gland to form a tight sliding fit with the tubular member 32 so as to render the hollow "cylinder chamber" or space 42 inside the spindle, between the head 34 and the bearing means 40, substantially airtight. Consequently, the spindle 30 can be raised along the piston rod 38 when air under pressure is admitted to this hollow space 42 and the spindle will drop when the pressure is released.

Such a reciprocating means or raising and lowering means for the spindle comprises a pipe line that includes a passage 50 in the guide rod 38, a chamber 52, a passage 54 in the base plate 4 terminating a nipple 56, and an extended hose or pipe fitted to a nipple 56. The upper end of the passage 50 passes through the bearing means 40 and opens into the hollow space 42 of the spindle 30. The lower end of the passage 50 opens to the closed chamber 52. This chamber 52 is in communication with the second passage 54 that is connected to the nipple 56 that, in turn, is connected to a hose, or the equivalent, that passes upwardly. Preferably a three way valve, either manually operable or automatically operable, controls the gas pressure in the space or chamber 42 of the spindle 30 in any known manner so that air under pressure can be supplied to this space when it is desired to raise the spindle to a position such as shown in Fig. 2, and such air can be exhausted to atmosphere when it is desired to lower the spindle to a position such as shown in Fig. 1.

The upper part of the chamber 6 also contains a supporting wall 60 that carries a pair of vertically spaced outer bearings 62 and 64. These bearings are preferably of a material which can be lubricated with water. Such materials are known and generally comprise a fabric or the like that is impregnated with a phenolic resin and molded under heat and pressure. For lubricating the bearings 62 and 64 the wall 60 has an annular space 66 between the bearings 62 and 64 and about the spindle 30. A passage 68 in the wall 60 leads from the space 66 to a water supply pipe 70.

For forcibly rotating the spindle in its lower position, the lower end of the tube 32 of the spindle 30 has fixed thereto a driven clutch member comprising an annular clutch plate 72, the lower side of which is provided with clutch material 74 of any suitable type. A driving clutch member is engaged by the driven clutch member in lowered position of the spindle. The driving clutch member comprises an annular gear 76 which is rotatably carried in ball bearings 78 carried by the bottom wall 4 of the main housing 1. The gear 76 is preferably of the same material as the bearings 62 and 64 and carries an annular brass clutch plate 80.

The gear 76 is driven at a reduced speed by a gear 82 driven by a motor 84, which is preferably an electric motor, that is carried inside of the second compartment 8. The gear 82 is attached to a shaft 86 that is geared by suitable gearing 88 to the drive shaft of the motor. Any suitable liquid tight packing seal 89 is provided for the shaft 86 where it passes through the bottom wall 16 of the compartment 8 so that the lower part of the compartment is substantially water-tight except for holes 90 at the very top of the compartment.

Energizing lines 92 and 94 for the electric motor 84 are carried inside a cable 96 that passes inside of a pipe 98 that is water-tightly secured to a hole in the lower part of a side wall 12 of the compartment 8. The pipe 98 is oversize with respect to the cable 96 and is connected to an air-supplied pipe 100, as shown in Fig. 4, so that air under pressure can be supplied to the inside of the compartment 8, this air slowly escaping through the small holes 90 in the top thereof. By keeping the compartment 8 filled with air under pressure a plenum chamber is provided for preventing water from seeping into the compartment 8 and damaging the electric motor 84. This flowing air also acts as cooling air for the motor.

In the operation of the device, when air under pressure is supplied to the passage 50, it flows into the cylinder chamber or space 42 of the spindle 30 and presses against the top of the guide rod 38 and against the head 34 of the spindle. The guide rod being fixed, the pressure causes the spindle 30 to rise until the clutch member 72 engages a stop plate 102 attached to the bottom of the wall 60 of the compartment 6. The stop plate 102 can be of any desired thickness.

In this upper or raised position of the spindle, the adapter 36 on the spindle extends above the induction heating coil 22 and can be loaded with a workpiece W to be heat treated. This workpiece W is shown in broken lines in Fig. 1. After being loaded, the gas under pressure in the space 42 of the spindle 30 is released and the spindle drops to the lowered position shown in Fig. 1 and places the part of the work W which is to be heat treated centrally within the induction heating coil 22. In the lower position of the spindle 30, its driven clutch member, comprising the clutch plate 72 and the clutch material 74, engages the surface of the driving clutch member, comprising the gear 76 and the drive clutch plate 80. Assuming that the motor 84 has been energized, the spindle 30 rotates when the two clutch members engage. Consequently, the work W, inside the induction heating coil 22, also rotates. A suitable "shot" of high frequency energy can be supplied to the induction heating coil while the work is so rotated and then quench liquid fed to the coil which passes through the perforations in the coil-wall 24 and flows downwardly across the top wall means 2 and across the housing 1 into the sink in which the housing may be carried, the top of which is indicated by the broken line 104 in Fig. 2. Such quench liquid can not enter the motor-compartment 8 which is water-tight as previously described. Additionally, any water escaping from the outer bearings 62 and 64 for the spindle 30 that flows into the spindle-compartment 6 can flow outwardly into the sink through an opening 106 through which a portion of the gear 82 passes for meshing with the gear 76 of the clutch.

The air pressure is then admitted to the space 42 for raising the spindle. The spindle continues to rotate because of its rotary momentum, but stops rotating in its raised position because of the friction between the driven clutch member 72 and the stop plate 102. This frictional engagement between the member 72 and plate 102 is increased by the air pressure in the space or chamber 42.

We have shown a combined induction heating coil and quench ring for convenience, but obviously these elements can be separate parts as is known in the art. In such case, it is preferable to have the induction coil about the work when the spindle is in down position, and the quench ring about the work when the spindle is in up position or in some intermediate position therebetween.

The adapter 36 that has been shown in Figs. 1 and 2 is of a type that receives a workpiece W having a stub shaft depending from a circular portion which is to be heat treated. Obviously, adapters can be changed in accordance with the particular workpiece to be heated; and a second form of adapter 108 is shown in Fig. 5. This adapter 108 has a tapered hole 110 that can fit on the tapered top of the head 34 of the spindle 30, and has a short central positioning rod 112 that fits a central hole in a workpiece W' which is a simple gear. In Fig. 5, it can be assumed that the adapter 108 is on a spindle which is in down position. In such down position the work W' is inside of an induction heating coil 114. When the spindle is raised to up position the work W' is inside of a quench ring 116.

While we have described our invention in a preferred form, it is obvious that it is subject to mechanical modifications and its principles can be embodied in different forms.

We claim as our invention:

1. Induction heating apparatus of a type described comprising a work-receiving spindle and an induction heating coil coaxially arranged along an upstanding axis, said spindle including a first clutch member, positioning means for moving said spindle in a direction along said axis between an upper position in which it can be loaded with work to be heat-treated and a lower position in which the work is placed in heating relation to said induction heating coil, a motor having a rotatable shaft, and gearing means including a second clutch member which is operable with said first clutch member for interconnecting said spindle and motor-shaft when said spindle is in said lower position.

2. Induction heating apparatus of a type described comprising a work-receiving spindle and an induction heating coil coaxially arranged along an upstanding axis, said spindle including a first clutch member, positioning means for moving said spindle along said axis between an upper position in which it can be loaded with work to be heated-treated and a lower position in which the work is placed in heating relation to said induction heating coil, motor means located adjacent said lower position of said spindle and operable for rotating said spindle, and clutch means connected to said motor means and operable with said first clutch member for rendering said motor means effectively operable only when said spindle is in said lower position.

3. Induction heating apparatus of a type described comprising a hollow spindle, bearing means for said spindle comprising an inner piston rod and outer bearing means, an induction heating coil coaxial with said spindle, said spindle having a work-receiving means at its top adapted to receive work to be inductively heated, said spindle being operable to and between an upper position and a lower position, said spindle in said upper position placing said work-receiving means above said induction heating coil, said spindle in said lower position placing work carried by said work-receiving means inside said induction heating coil, a motor, and gearing means including a clutch member for interconnecting said spindle and motor only when said spindle is in said lower position.

4. Induction heating apparatus of a type described comprising a work-receiving spindle and an induction heating coil, means for reciprocating said spindle along an upstanding axis to and between an upper position and a lower position, said spindle including a first clutch member which moves with said spindle between said positions, bearing means for said spindle, said spindle placing work carried thereby in heating relation to said induction heating coil when in a first of said positions and out of such relation when in the second of said positions, and motor means including a second clutch member for rotating said spindle when said spindle is in said first position, the last said means comprising a motor having a rotatable shaft and gearing means connected between said shaft and said second clutch member, said second clutch member being positioned to cooperate with said first clutch member when the spindle is in said first position.

5. In apparatus for use with radio frequency heating equipment, the combination of a hollow spindle having a work holder at a first of its ends, resinous bearing means for said spindle, positioning means operable with said spindle to selectively reciprocate the spindle between a first and a second position, an induction heating coil located relative to said spindle such that a workpiece held by the work holder can be placed into heat treatment position within the coil by movement of the spindle, motor means having a rotatable shaft, a first clutch member having a first and a second friction surface, said first clutch member being fastened to the second end of said spindle, a second clutch member fastened to said shaft and operable with the first friction surface of said first clutch member, and a third clutch member operable with the second friction surface of said first clutch member.

6. The apparatus as claimed in claim 5 characterized by said third clutch member being non-rotatable respecting the rotary movement of the spindle.

7. The apparatus as claimed in claim 5 characterized by said heating equipment including an induction heating coil, with said second clutch member being located at said second position respecting the reciprocal movement of the spindle, said second position being the one in which the work in said work holder is properly located for heat treatment respecting said heating coil.

8. The apparatus as claimed in claim 5 characterized by support means being provided for said bearing means, said support means having a surface adjacent the location of the second end of said spindle when the latter is in said first position of its movement, with said third clutch member being non-rotatably fastened to said surface of the support means.

ARTHUR A. LYNESS, Jr.
THEODORE P. KINN.

REFERENCES CITED

The following references are of record in the file of this patent:

UNITED STATES PATENTS

| Number | Name | Date |
|---|---|---|
| 1,085,146 | McClellan | Jan. 27, 1914 |
| 2,308,788 | Somes | Jan. 19, 1943 |
| 2,329,944 | Schankenbach | Sept. 21, 1943 |
| 2,393,484 | Somes | Jan. 22, 1946 |
| 2,454,039 | Cox | Nov. 16, 1948 |
| 2,462,205 | Machlett et al. | Feb. 22, 1949 |
| 2,462,657 | McNairy | Feb. 22, 1949 |
| 2,527,238 | Woodson | Oct. 24, 1950 |